Patented May 16, 1933

1,908,922

UNITED STATES PATENT OFFICE

FRANCIS W. RUZICKA, OF CHATHAM, NEW JERSEY

METHOD OF AND COMPOSITION FOR EXTENDING THE LIFE OF CUT FLOWERS

No Drawing.     Application filed April 19, 1932. Serial No. 606,283.

This invention relates to a novel method of and composition for treating cut flowers, so that preservation of their freshness during the period of commercial distribution and handling is assured, while at the same time the useful life thereof, after reaching the hands of the consumer, is greatly prolonged.

I have found that, contrary to usual opinion, few cut flowers wilt or die by reason of mature age, but rather that the wilting or death thereof is usually premature. The principal causes of premature wilting or death are: (1st) Excessive transpiration, i. e. loss of water initially immanent in the tissues of cut flowers; and (2nd) Rapid exhaustion of food materials from the tissues of cut flowers, which is due to low food reserves (especially in plants raised under forcing conditions), and to increased enzymic or digestive action occurring in the tissues, which may include undesirable digestion of cellulose ordinarily present as supporting tissue, particularly in storage cells.

It is the principal object of my invention to provide a novel method of treatment whereby the food reserve of cut flowers may be increased and conserved, and excessive transpiration restrained, to the end that tendency to wilting or death is strongly resisted over a comparatively long period of time, and especially under conditions of handling incident to commercial distribution of such cut flowers.

My invention has for a further object to provide a novel method of and composition for treating practically all classes of cut flowers which are usually preserved by standing in water, but which is especially adapted for the treatment and preservation of rosses, carnations, snapdragons, orchids, sweetpeas, chrysanthemums and most of the more or less hardy blooms as distinguished from exotic types.

Briefly the novel method of treatment for cut flowers, according to my invention, and for the purposes stated, comprises the following:

Immediately after being cut, the flowers are placed in containers filled with a special nutrient solution, containing immediately available food supply and later available food supply to be developed during the subsequent life of the cut flowers; illustrative examples of the composition of such nutrient solution will later appear.

The cut flowers are allowed to remain in the nutrient solution for periods of preferably from three to twelve hours under a surrounding temperature condition of forty to fifty degrees Fahrenheit, and under a humidity condition of from sixty to eighty degrees, preferably with light diminished or even entirely absent.

After the cut flowers have stood in the nutrient solution for the desired period of time, sufficient to assure the absorption thereby of the reserve food supply furnished by the solution, the same are removed and rinsed with clean water, whereupon the cut ends of the stems thereof are sealed against extrusion of the surplus food supplies which have been taken up thereby. The method of sealing preferably comprises dipping the cut ends of the flower stems in melted paraffine.

A simple composition adapted to provide a nutrient solution suitable for use in connection with the method of treatment above outlined, comprises the following:

Sugar (sucrose)_____ 1 part by weight
Starch (e. g. corn)_____ traces to ½ part by weight
Water_____ 4 parts by weight
Postassium permanganate_____ traces In the above composition, the more or less immediately available food supply is furnished by the sugar, and a later available food supply is furnished by the starch. The potassium permanganate serves a double purpose, viz. the potassium functions to stimulate the conversion of the sugar and starch into the simpler sugar forms which are most easily and readily digested and distributed to the tissues and cells of the cut flower, while the permanganate serves as an antiseptic to prevent development of mold or other injurious effects deleterious to the healthy condition of the flowers.

A more specific composition of nutrient solution in which the sugars are of characters designed to become relatively more or less quickly available is the following:

| | |
|---|---|
| Maltose, fructose or glucose (either singly or in desired combinations) | ½ part by weight |
| Sucrose | ½ part by weight |
| Starch | traces to ½ part by weight |
| Water | 4 parts by weight |
| Potassium permangante | traces |
| Organic silicates | traces |

In this composition, the maltose, fructose or glucose, whether selectively used alone or in combination, furnish a form of sugar most quickly and easily taken up and digested, and consequently may be classed as the immediately available food supply. The sucrose furnishes a later available food supply, when converted by the enzymic or digestive reactions in the tissues of the cut flowers especially as aided by the potassium, and the starch, under similar reactions, furnishes a still later available food supply. The organic silicates serve to strengthen the tissues of the cut flowers, and especially to stiffen the stems to greater rigidity and firmness.

The above formulas are to be understood as illustrative and not in a limiting sense, since both as to specific ingredients, and relative proportions thereof, various modifications may be made within the scope of this invention as defined in the claims appended to this specification.

In the carrying out of the above described method, the initial placing of the cut flowers in the nutrient solution produces a translocation and diffusion of an additional food supply in the tissues of the stems, leaves and blooms of the cut flowers, thus building up the reserves thereof in resistance to wilting; this being of marked advantage with respect to flowers raised under forcing conditions, since the latter, almost without exception, are low in stored food, so that when cut off from the roots and sunlight such limited reserve as is possessed thereby is soon exhausted. The translocation of the sugars from the nutrient solution results in an increased concentration of the cell sap in all live cells of the tissues, and this condition automatically develops a reduction in the amount of water lost by transpiration. The resultant prevention of excessive transpiration in turn results in a no inconsiderable lengthening of the life of the cut flowers.

The sealing of the cut ends of the flower stems by the application thereto of the coating of paraffine, not only prevents extrusion of the surplus sugars from the supplies thereof taken up from the nutrient solution, but also prevents the stem from drying. I have found that in cases where the cut flowers have been treated by my method and the cut ends of the stems sealed as stated, that the flowers have easily withstood wilting in a humidity of eighty to ninety degrees for several days, without necessity of being stood in water.

A further advantage of sealing the stems of the cut flowers is that the end of the stem is prevented from drying and hardening, so that the ultimate consumer need only scratch through the paraffine to expose fresh tissues before placing the flowers in water, or cut off the coated ends of the stems, thereby likewise exposing fresh tissue. The consumer can soon be taught the importance of such practice, when it is brought to the attention that frequently the wilting of flowers soon after the purchase thereof is due to the fact that the cut end of the stem has dried out, during commercial handling, to an extent tending to close up the sap ducts, so that, when placed in water, the stem cannot take up or absorb sufficient water to sustain the useful life of the flower. The sealing of the stem makes it imperative to open up or cut off the seal to expose the sap ducts to the water.

Having thus described my invention, I claim:—

1. The method of extending the life of cut flowers, which consists in standing the stems of freshly cut flowers in a nutrient solution containing food supplying sugar for a period of time sufficient to permit translocation or diffusion of a reserve food supply in the tissues of the cut flowers, and thereupon sealing the cut ends of the stems upon removal from said solution.

2. The method of extending the life of cut flowers, which consists in standing the stems of freshly cut flowers in a nutrient solution containing food supplying sugar for a period of time up to twelve hours and in a surrounding temperature approximating from forty to fifty degrees Fahrenheit and a humidity condition approximating sixty to eighty degrees, and thereupon sealing the cut ends of the stems with an impervious coating material upon removal from said solution.

3. The method of extending the life of cut flowers, which consists in standing the stems of freshly cut flowers in a nutrient solution containing food supplying sugar for a period of time up to twelve hours and in a surrounding temperature approximating from forty to fifty degrees Fahrenheit and a humidity condition approximating sixty to eighty degrees, and thereupon sealing the cut ends of the stems by dipping the same in fluid paraffine.

4. The method of extending the life of cut flowers, which consists in standing the stems of fresh cut flowers in a nutrient solution containing sugar and starch, parts of which are immediately available as a food supply, and parts of which are later available as additional food supply, together with an agent capable of reacting to convert sugar and starch into forms readily assimilated by the tissues and cells of the stems, leaves and blooms of the cut flowers; and then, after removal from said solution, sealing the cut ends of the stems with an impervious coating material.

5. The method of extending the life of cut flowers, which consists in standing the stems of freshly cut flowers in a nutrient solution containing sugar and starch, parts of which are imemdiately available as a food supply, and parts of which are later available as additional food supply, together with an agent capable of reacting to convert sugar and starch into forms readily assimilated by the tissues and cells of the stems, leaves and blooms of the cut flowers; allowing the flowers to remain in said solution for a period of time not exceeding twelve hours while in a surrounding temperature not exceeding fifty degrees Fahrenheit and a humidity condition not exceeding eighty degrees and while shielded from bright light; and then, after removal from said solution, sealing the cut ends of the stem by dipping the same in melted paraffine.

6. The method of extending the life of cut flowers, which consists in supplying reserve food elements to the tissues thereof when freshly cut, and thereupon sealing the cut ends of the stems with an impervious coating material.

7. The method of extending the life of cut flowers, which consists in supplying reserve food elements to the tissues thereof when freshly cut, and thereupon sealing the cut ends of the stems by dipping the same in melted paraffine.

8. A composition for extending the life of cut flowers consisting in an aqueous nutrient solution for application to and through the freshly cut stems of the flowers, said solution comprising sucrose, starch, and potassium permanganate.

9. A composition for extending the life of cut flowers consisting in an aqueous nutrient solution for application to and through the freshly cut stems of the flowers, said solution comprising sugars such as maltose, fructose and glucose to furnish an immediately available food supply, sucrose to furnish a later available food supply, starch to furnish a still later available food supply, and potassium permanganate to coact with the sucrose and starch in converting the same into available food.

10. A composition for extending the life of cut flowers consisting in a aqueous nutrient solution for application to and through the freshly cut stems of the flowers, said solution comprising sugars such as maltose, fructose and glucose to furnish an immediately available food supply, sucrose to furnish a later available food supply, starch to furnish a still later available food supply, potassium permanganate to coact with the sucrose and starch in converting the same into available food, and organic silicates to give rigidity and firmness to the flower stems.

In testimony, that I claim the invention set forth above I have hereunto set my hand this 12th day of April 1932.

FRANCIS W. RUZICKA.